Patented Jan. 16, 1940

2,186,975

UNITED STATES PATENT OFFICE 2,186,975

CRYSTALLINE CALCIUM LACTOBIONATE CALCIUM BROMIDE AND PROCESS FOR MAKING THE SAME

Horace S. Isbell, Washington, D. C., assignor to the Government of the United States, represented by the Secretary of Commerce No Drawing. Application April 10, 1933, Serial No. 665,344

8 Claims. (Cl. 260—535)

(Granted under the act of March 3, 1883, as amended April 30, 1928; 370 O. G. 757)

This invention relates to crystalline calcium lactobionate-calcium bromide and process for making the same.

This application is filed pursuant to the provisions of the act of March 3, 1883 (c. 143, 22 Stats. L., p. 625) as amended by the act of April 30, 1928, and the invention described therein, if patented, may be manufactured and used by or for the Government of the United States for governmental purposes without the payment to the applicant of any royalty thereon.

An object of the present invention is to provide a new product and process therefor. The product, among other things, is of value in the separation of calcium lactobionate, and as a substance for therapeutic use. As a therapeutic product, this new double salt combines the strongly sedative properties of calcium bromide with the desirable features of calcium salts of the sugar acids. It has the decided advantage over calcium bromide, as a medicinal agent, that it is not hygroscopic and may be kept indefinitely without deterioration because it does not absorb moisture.

According to the present invention, the double salt of calcium lactobionate and calcium bromide is obtained by crystallization of the salt from an aqueous solution containing calcium lactobionate and calcium bromide. I prefer to use calcium lactobionate and calcium bromide in approximately equal molecular proportions and to crystallize the product from aqueous solution, although other solvents such as ethyl or methyl alcohol may be used. The method for obtaining the calcium lactobionate and for separating the product may be varied widely as illustrated in the following examples.

Example I 180 grams α-lactose monohydrate are dissolved in 1 liter of water and 100 grams calcium bromide and 25 grams calcium carbonate are added. A direct current is then passed through the solution to bring about the electrolytic oxidation of the lactose to lactobionic acid by the method described in my United States Patent No. 1,976,731, dated October 16, 1934. When the oxidation is substantially complete, as shown by sugar determinations, the electrolysis is stopped and the electrolyte is filtered in order to remove any insoluble material. The filtrate, which contains approximately 185 grams calcium lactobionate and 100 grams calcium bromide, is evaporated to a thick sirup, from which crystalline calcium lactobionate-calcium bromide separates on standing. The crystals are conveniently separated by means of a centrifuge and washed with water. The analysis of the product when dried in air, preferably at 40° C. corresponds to the formula:

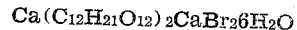

$Ca(C_{12}H_{21}O_{12})_2 CaBr_2 6H_2O$

The mother liquors are returned to the electrolytic cell and more lactose and calcium bromide added and the process repeated. The process can be run continuously by adding lactose, calcium carbonate and calcium bromide at the same rate as calcium lactobionate calcium bromide is separated. Finally, the electrolyte becomes foul and must be worked up for reclaiming the calcium bromide and calcium lactobionate. The latter can be conveniently separated by precipitation as a basic calcium salt.

Calcium lactobionate-calcium bromide can be recrystallized from water, but in small scale preparations it is easier to dissolve the product in about an equal weight of hot water and then add ethyl alcohol with stirring, until the solution becomes slightly turbid. Crystallization begins immediately. Yields up to 90 per cent of the theoretical have been obtained.

If it is desired to prepare the calcium lactobionate without the use of electrolysis the following procedure may be followed:

Example II 100 grams bromine are added, with stirring, to a solution containing 171 grams β-lactose and 375 grams calcium carbonate in 1 liter of water. A rapid reaction takes place. The products of the reaction are shown by the following equation:

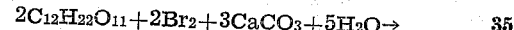
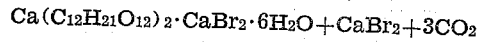

$2C_{12}H_{22}O_{11} + 2Br_2 + 3CaCO_3 + 5H_2O \rightarrow$ $Ca(C_{12}H_{21}O_{12})_2 \cdot CaBr_2 \cdot 6H_2O + CaBr_2 + 3CO_2$ After a short time the reaction mixture is transferred to a glass distillation apparatus and the excess bromine removed by distillation. The last traces of the bromine are removed by bubbling an unsaturated substance, such as ethylene, through the solution. The ethylene combines with the excess bromine to form ethylene bromide, which is volatile and is removed by distillation. The aqueous solution, containing calcium lactobionate and calcium bromide, is concentrated to a thick sirup, which is then diluted with about an equal volume of 95% alcohol and seeded with crystalline calcium lactobionate-calcium bromide. On standing, the pure salt is obtained in about 75% yield.

In the event that it is desired to prepare calcium lactobionate-calcium bromide using both the bromine and electrolytic oxidations the steps are as follows:

180 grams lactose and 40 grams bromine are dissolved in 1 liter of water and 75 grams calcium carbonate are added prior to the electrolysis. The bromine reacts with the lactose giving lactobionic lactone and hydrobromic acid. The lactone and hydrobromic acid react with the calcium carbonate to give calcium lactobionate and calcium bromide. A direct current is passed through the solution of calcium lactobionate and calcium bromide until the remaining lactose is converted into calcium lactobionate. The amount of electricity required is about one-half faraday. On evaporation the electrolyte gives crystalline calcium lactobionate-calcium bromide in good yield.

While my new product has been referred to herein as calcium lactobionate-calcium bromide, it may with equal propriety be called calcium bromide galacto-gluconate. This is due to the fact that lactobionic acid is galacto-gluconic acid and the calcium salt thereof is calcium galacto-gluconate.

I claim:

1. Process for the production of calcium lactobionate-calcium bromide, which comprises crystallization of calcium lactobionate-calcium bromide from a solution of calcium lactobionate containing calcium bromide.

2. A process for the preparation of calcium lactobionate-calcium bromide, which comprises electrolytic oxidation of lactose in the presence of calcium carbonate and calcium bromide, followed by the crystallization of calcium lactobionate-calcium bromide from the electrolyte.

3. A crystalline double salt of calcium lactobionate and calcium bromide, the analysis of which, corresponds to the formula:

$$Ca(C_{12}H_{21}O_{12})_2 \cdot CaBr_2 \cdot 6H_2O$$

4. Process for the production of crystalline calcium locatobionate-calcium bromide which consists in oxidizing lactose by the combined action of bromine water and an electric current in the presence of calcium carbonate to give a solution of calcium lactobionate and calcium bromide in approximately equimolecular proportions, and separating crystalline calcium lactobionate-calcium bromide from the solution.

5. A process for the production of calcium bromide galacto-gluconate which comprises oxidizing lactose in the presence of a bromide and a calcium neutralizing agent, and separating therefrom crystalline calcium bromide galacto-gluconate.

6. A process for the production of crystalline calcium bromide galacto-gluconate which comprises the electrolytic oxidation of lactose in the presence of a bromide and a calcium neutralizing agent, and crystallizing from the electrolyte calcium bromide galacto-gluconate.

7. A non-hygroscopic therapeutic product comprising the crystalline salt calcium bromide galacto-gluconate.

8. A process for the production of calcium lactobionate-calcium bromide which comprises seeding a solution of calcium lactobionate containing calcium bromide with crystals of calcium lactobionate-calcium bromide 6H$_2$O, and crystallizing calcium lactobionate-calcium bromide from the solution.

HORACE S. ISBELL.